United States Patent
Buzaglo et al.

(10) Patent No.: US 11,091,377 B2
(45) Date of Patent: *Aug. 17, 2021

(54) CHLORINATOR

(71) Applicant: MAGEN ECO ENERGY A.C.S LTD, D N Hanegev (IL)

(72) Inventors: Ronen Bar Buzaglo, Ein Habsor (IL); Itay Lewin, Kibbutz Magen (IL); Omer Kadosh, D.N. Dead Sea (IL)

(73) Assignee: MAGEN ECO ENERGY A.C.S. LTD, D N Hanegev (IL)

( * ) Notice: Subject to any disclaimer, the term of this patent is extended or adjusted under 35 U.S.C. 154(b) by 87 days.

This patent is subject to a terminal disclaimer.

(21) Appl. No.: 16/686,277

(22) Filed: Nov. 18, 2019

(65) Prior Publication Data

US 2020/0095141 A1    Mar. 26, 2020

Related U.S. Application Data

(62) Division of application No. 15/408,944, filed on Jan. 18, 2017, now Pat. No. 10,513,447.

(60) Provisional application No. 62/279,857, filed on Jan. 18, 2016.

(51) Int. Cl.

| | |
|---|---|
| *C02F 1/461* | (2006.01) |
| *C02F 1/467* | (2006.01) |
| *C25B 1/16* | (2006.01) |
| *C02F 103/42* | (2006.01) |
| *C25B 15/02* | (2021.01) |
| *C25B 9/06* | (2006.01) |

(52) U.S. Cl.
CPC ........ *C02F 1/46104* (2013.01); *C02F 1/4674* (2013.01); *C25B 1/16* (2013.01); *C02F 2103/42* (2013.01); *C02F 2201/46145* (2013.01); *C25B 9/06* (2013.01); *C25B 15/02* (2013.01)

(58) Field of Classification Search
CPC .................................................. C02F 1/46104
See application file for complete search history.

(56) References Cited

U.S. PATENT DOCUMENTS

| | | | |
|---|---|---|---|
| 4,085,028 | A | 4/1978 | McCallum |
| 4,171,256 | A | 10/1979 | Themy |
| 4,561,955 | A | 12/1985 | Jackson |
| 4,599,159 | A | 7/1986 | Hilbig |
| 7,211,176 | B2 | 5/2007 | Hin et al. |
| 7,695,613 | B2 | 4/2010 | Doyle et al. |
| 8,920,615 | B2 | 12/2014 | Davidson et al. |
| 2006/0249400 | A1 | 11/2006 | Bremauer |
| 2010/0250449 | A1 | 9/2010 | Doyle et al. |

(Continued)

*Primary Examiner* — Brian W Cohen
(74) *Attorney, Agent, or Firm* — Vorys, Sater, Seymour and Pease LLP; Anthony Venturino

(57) ABSTRACT

A chlorinator configured to produce one or more sanitizing agents from a solute dissolved in water is provided. The chlorinator comprises an operational unit defining an electrolysis chamber for flow therethrough of the water, electrolyzing electrodes for the electrolysis, and a control unit having a housing containing therewithin a chlorinator controller for directing operation of the electrolyzing electrodes. The chlorinator further comprises an electronic flow sensor comprising a pair of spaced-apart sensing electrodes projecting into the electrolysis chamber, and a circuit closeable by electrically connecting the sensing electrodes. The electronic flow sensor is configured to detect a flow condition when the circuit is closed, and to detect a non-flow condition when the circuit remains open.

16 Claims, 12 Drawing Sheets

(56) References Cited

U.S. PATENT DOCUMENTS

| | | |
|---|---|---|
| 2011/0278158 A1 | 11/2011 | Briggs et al. |
| 2011/0303533 A1 | 12/2011 | Shyu |
| 2013/0105372 A1 | 5/2013 | Chen et al. |
| 2013/0105403 A1 | 5/2013 | Chen et al. |

CHLORINATOR

TECHNOLOGICAL FIELD

The presently disclosed subject matter is related to chlorinators, in particulars chlorinators configured to produce chlorine-based sanitizing agents for electrolysis.

BACKGROUND OF THE INVENTION

Swimming pools are commonly treated with a sanitizing agent, such as chlorine, in order to maintain a clean swimming environment. The sanitizing agent may be dispensed at a suitable rate to the water by a dedicated dispenser as a liquid or a solid, such as in tablet form.

The sanitizing agent may also be produced within the water itself. For example, salt may be added to the swimming water at a tolerable level. The salted water is directed into a chlorinator which produces the sanitizing agent through electrolysis. The water with the newly-produced sanitizing agent is then directed back into the pool.

SUMMARY

According to one aspect of the presently disclosed subject matter, there is provided a chlorinator configured to produce one or more sanitizing agents from a solute dissolved in water, the chlorinator comprising an operational unit defining an electrolysis chamber for flow therethrough of the water, electrolyzing electrodes for the electrolysis, and a control unit having a housing containing therewithin a chlorinator controller for directing operation of the electrolyzing electrodes, the chlorinator further comprising an electronic flow sensor comprising a pair of spaced-apart sensing electrodes projecting into the electrolysis chamber, and a circuit closeable by electrically connecting the sensing electrodes, wherein the electronic flow sensor is configured to detect a flow condition when the circuit is closed, and to detect a non-flow condition when the circuit remains open.

The sensing electrodes may comprise a pair of parallely arranged plates.

The chlorinator may comprise flow openings constituting an inlet and outlet of the electrolysis chamber, the chlorinator being designed to be installed such that the sensing electrodes are above the flow openings. The flow opening may be arranged coaxially with one another.

The electronic flow sensor may further comprise a sensing controller configured to direct operation thereof and to communicate with the chlorinator controller.

The chlorinator may further comprise a cassette comprising the electrolyzing electrodes and the electronic flow sensor. The cassette may comprise a cassette controller comprising the sensing controller.

The chlorinator may further comprise a bi-directional mechanical flow sensor configured to detect a flow of water across the electrolyzing electrodes in each one of two opposite directions, the mechanical flow sensor comprising a paddle configured to be pivoted about an axis from a rest position by the flow of water, a sensing magnet configured to move with the paddle and disposed spaced from the axis, and a magnet sensor configured to detect movement of the sensing magnet from the rest position of the paddle; the mechanical flow sensor further comprising a centering arrangement configured to maintain the paddle in its rest position in the absence of a flow of water therepast.

All elements of the centering arrangement not used for flow sensing may be external to the paddle.

The centering arrangement may comprise two or more positioning magnets configured to exert equal magnetic forces on the sensing magnet when the paddle is in its rest position. The positioning magnets may be aligned such that opposite poles thereof face the sensing magnet. The dominant magnetic force exerted by each positioning magnet on the sensing magnet may be a repelling magnetic force. At least two of the positioning magnets may be disposed on opposite sides of the paddle.

The chlorinator may further comprise stoppers configured to limit the movement of the paddle in each direction. The stoppers may project in a direction from the axis in a direction opposite that in which the sensing magnet is disposed.

The centering arrangement may comprise two or more biasing elements, such as springs, configured to impart equal, but oppositely directed, forces on the paddle in its rest position.

The magnet sensor may comprise a reed switch.

The chlorinator may be configured to detect an error condition when the electronic and mechanical flow sensors detect different flow conditions.

The cassette may further comprise the mechanical flow sensor.

The electrolyzing electrodes may be formed as flat plates.

According to another aspect of the presently disclosed subject matter, there is provided an electrolysis cassette for a chlorinator, the cassette configured to facilitate production of one or more sanitizing agents from a solute dissolved in water flowing through the chlorinator; the cassette comprising electrolyzing electrodes for the electrolysis and an electronic flow sensor; the electronic flow sensor comprising a pair of spaced-apart sensing electrodes, and a circuit closeable by electrically connecting the sensing electrodes, wherein the electronic flow sensor is configured to detect a flow condition when the circuit is closed, and to detect a non-flow condition when the circuit remains open.

The sensing electrodes may comprise a pair of parallely arranged plates.

The electronic flow sensor may further comprise a sensing controller configured to direct operation thereof and to communicate with an external controller.

The electrolysis cassette may further comprise a cassette controller comprising the sensing controller.

The electrolysis cassette may further comprise a bi-directional mechanical flow sensor configured to detect a flow of water across the electrolyzing electrodes in each one of two opposite directions, the mechanical flow sensor comprising a paddle configured to be pivoted about an axis from a rest position by the flow of water, a sensing magnet configured to move with the paddle and disposed spaced from the axis, and a magnet sensor configured to detect movement of the sensing magnet from the rest position of the paddle; the mechanical flow sensor further comprising a centering arrangement configured to maintain the paddle in its rest position in the absence of a flow of water therepast.

The centering arrangement may comprise two or more positioning magnets configured to exert equal magnetic forces on the sensing magnet when the paddle is in its rest position. The positioning magnets may be aligned such that opposite poles thereof face the sensing magnet. The dominant magnetic force exerted by each positioning magnet on the sensing magnet may be a repelling magnetic force. At least two of the positioning magnets may be disposed on opposite sides of the paddle.

The electrolysis cassette may further comprise stoppers configured to limit the movement of the paddle in each direction. The stoppers may project in a direction from the axis in a direction opposite that in which the sensing magnet is disposed.

The centering arrangement may comprise two or more biasing elements, such as springs, configured to impart equal, but oppositely directed, forces on the paddle in its rest position.

The magnet sensor may comprise a reed switch.

The electrolysis cassette may be configured to detect an error condition when the electronic and mechanical flow sensors detect different flow conditions.

The electrolyzing electrodes may be formed as flat plates.

According to a further aspect of the presently disclosed subject matter, there is provided a chlorinator configured to produce one or more sanitizing agents from a solute dissolved in water, the chlorinator comprising an operational unit defining an electrolysis chamber for flow therethrough of the water, electrolyzing electrodes for the electrolysis, and a control unit having a housing containing therewithin a chlorinator controller for directing operation of the electrolyzing electrodes, the chlorinator further comprising a bi-directional mechanical flow sensor configured to detect a flow of water across the electrolyzing electrodes in each one of two opposite directions, the mechanical flow sensor comprising a paddle configured to be pivoted about an axis from a rest position by the flow of water, a sensing magnet configured to move with the paddle and disposed spaced from the axis, and a magnet sensor configured to detect movement of the sensing magnet from the rest position of the paddle; the mechanical flow sensor further comprising a centering arrangement configured to maintain the paddle in its rest position in the absence of a flow of water therepast.

All elements of the centering arrangement not used for flow sensing may be external to the paddle.

The centering arrangement may comprise two or more positioning magnets configured to exert equal magnetic forces on the sensing magnet when the paddle is in its rest position. The positioning magnets may be aligned such that opposite poles thereof face the sensing magnet. The dominant magnetic force exerted by each positioning magnet on the sensing magnet may be a repelling magnetic force. At least two of the positioning magnets may be disposed on opposite sides of the paddle.

The chlorinator may further comprise stoppers configured to limit the movement of the paddle in each direction. The stoppers may project in a direction from the axis in a direction opposite that in which the sensing magnet is disposed.

The centering arrangement may comprise two or more biasing elements, such as springs, configured to impart equal, but oppositely directed, forces on the paddle in its rest position.

The magnet sensor may comprise a reed switch.

The chlorinator may further comprise a cassette comprising the electrolyzing electrodes and the mechanical flow sensor. The cassette may further comprise the mechanical flow sensor.

The electrolyzing electrodes may be formed as flat plates.

According to a still further aspect of the presently disclosed subject matter, there is provided an electrolysis cassette for a chlorinator, the cassette configured to facilitate production of one or more sanitizing agents from a solute dissolved in water flowing through the chlorinator; the cassette comprising electrolyzing electrodes for the electrolysis and a bi-directional mechanical flow sensor configured to detect a flow of water across the electrolyzing electrodes in each one of two opposite directions, the mechanical flow sensor comprising a paddle configured to be pivoted about an axis from a rest position by the flow of water, a sensing magnet configured to move with the paddle and disposed spaced from the axis, and a magnet sensor configured to detect movement of the sensing magnet from the rest position of the paddle; the mechanical flow sensor further comprising a centering arrangement configured to maintain the paddle in its rest position in the absence of a flow of water therepast.

The centering arrangement may comprise two or more positioning magnets configured to exert equal magnetic forces on the sensing magnet when the paddle is in its rest position. The positioning magnets may be aligned such that opposite poles thereof face the sensing magnet. The dominant magnetic force exerted by each positioning magnet on the sensing magnet may be a repelling magnetic force. At least two of the positioning magnets may be disposed on opposite sides of the paddle.

The electrolysis cassette may further comprise stoppers configured to limit the movement of the paddle in each direction. The stoppers may project in a direction from the axis in a direction opposite that in which the sensing magnet is disposed.

The centering arrangement may comprise two or more biasing elements, such as springs, configured to impart equal, but oppositely directed, forces on the paddle in its rest position.

The magnet sensor may comprise a reed switch.

The electrolyzing electrodes may be formed as flat plates.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1A:
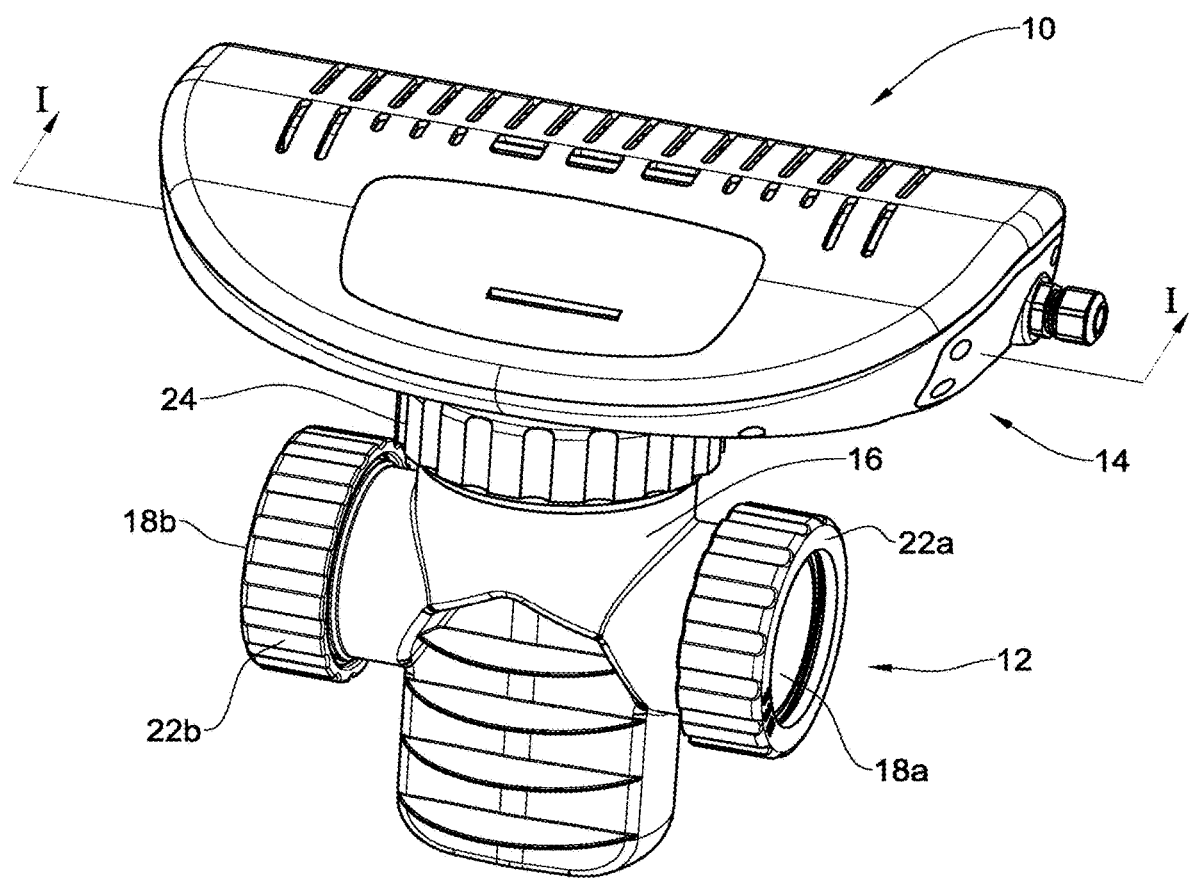
FIG. 1A is a perspective view of a chlorinator as described in the presently disclosed subject matter.
Figure 1B:
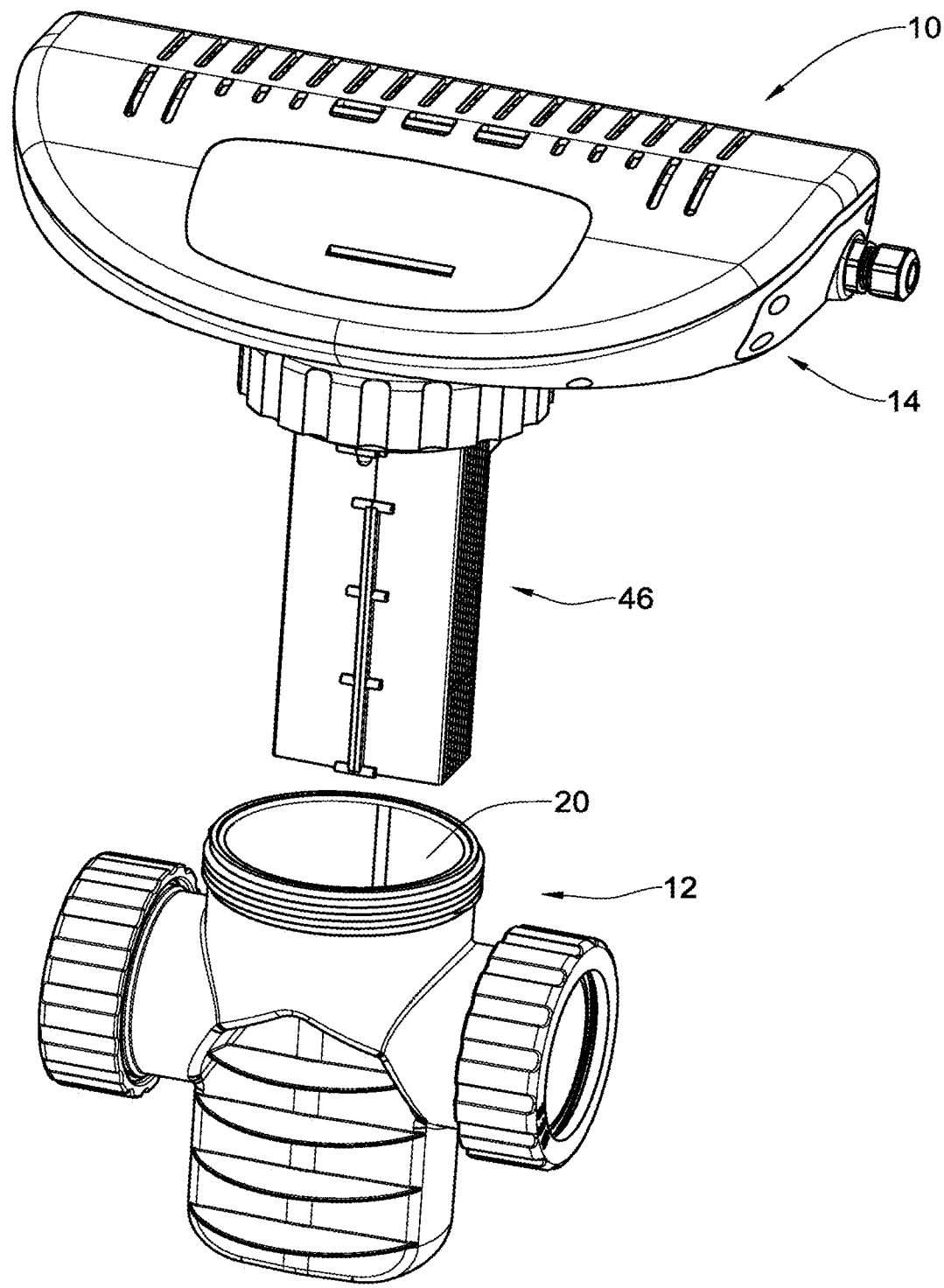
FIG. 1B is an exploded view of the chlorinator illustrated in FIG. 1A.

As illustrated in FIGS. 1A and 1B, there is provided a chlorinator, which is generally indicated at 10. The chlorinator 10 is configured to utilize electrolysis to produce sanitizing agents from a solute, for example to be supplied to a swimming pool. For example, the chlorinator 10 may be a salt-water chlorinator, configured to electrolyze salt (NaCl) dissolved in water to produce hypochlorous acid and sodium hypochlorite, as is well known in the art. The chlorinator 10 comprises an operational unit 12 and a control unit 14, coupled (e.g., detachably) to one another by any suitable method, for example mechanically, e.g., by screwing engagement, glued, welded, etc. As illustrated in FIG. 1B, an electrolysis cassette 46 is received within the operational unit 12, and connected via the underside of the control unit 14 to a controller therewithin (as described below).

The operational unit 12 comprises a hollow electrolysis chamber 16 for receipt therein of the electrolysis cassette 46. It is provided with oppositely-disposed flow openings 18a, 18b (herein the present disclosure, the reference numeral 18 will be used to refer to the flow openings 18a and 18b collectively; similarly for all elements thereof, as well as other elements of the chlorinator 10 indicated by similar reference numerals, mutatis mutandis) serving as a water inlet and outlet, and an upwardly-facing opening 20 for receipt therein of the electrolysis cassette 46.

Figure 2:
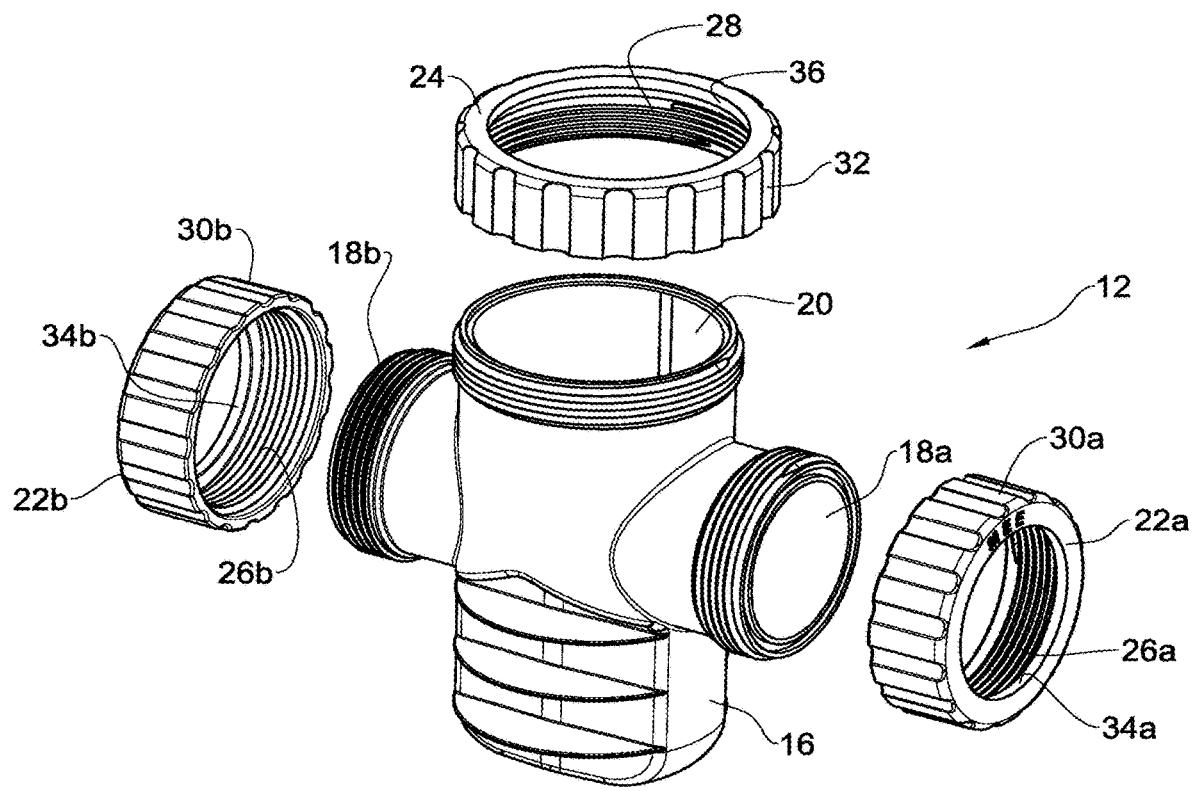
FIG. 2 is an exploded view of an operational unit of the chlorinator illustrated in FIG. 1A.

Pipe fastening rings 22a, 22b (so called as they typically facilitate connection to a pipe; it will be appreciated that they may be configured/utilized to facilitate connection to any suitable water-carrying conduit) and main fastening ring 24 are provided at each of the openings 18a, 18b, 20 to facilitate attachment connection thereto of different elements, each as described below. As seen in FIG. 2, each of the openings 18a, 18b, 20 is threaded. Accordingly, each of the fastening rings 22a, 22b, 24 is correspondingly threaded on an inner surface 26a, 26b, 28 thereof, and has an outer surface 30a, 30b, 32 which may be formed with a gripping geometry to facilitate, e.g., tightening/loosening of the fastening ring on its respective opening by manual rotation, and an inwardly-directed lip 34a, 34b, 36 at a distal end thereof.

Figure 1C:
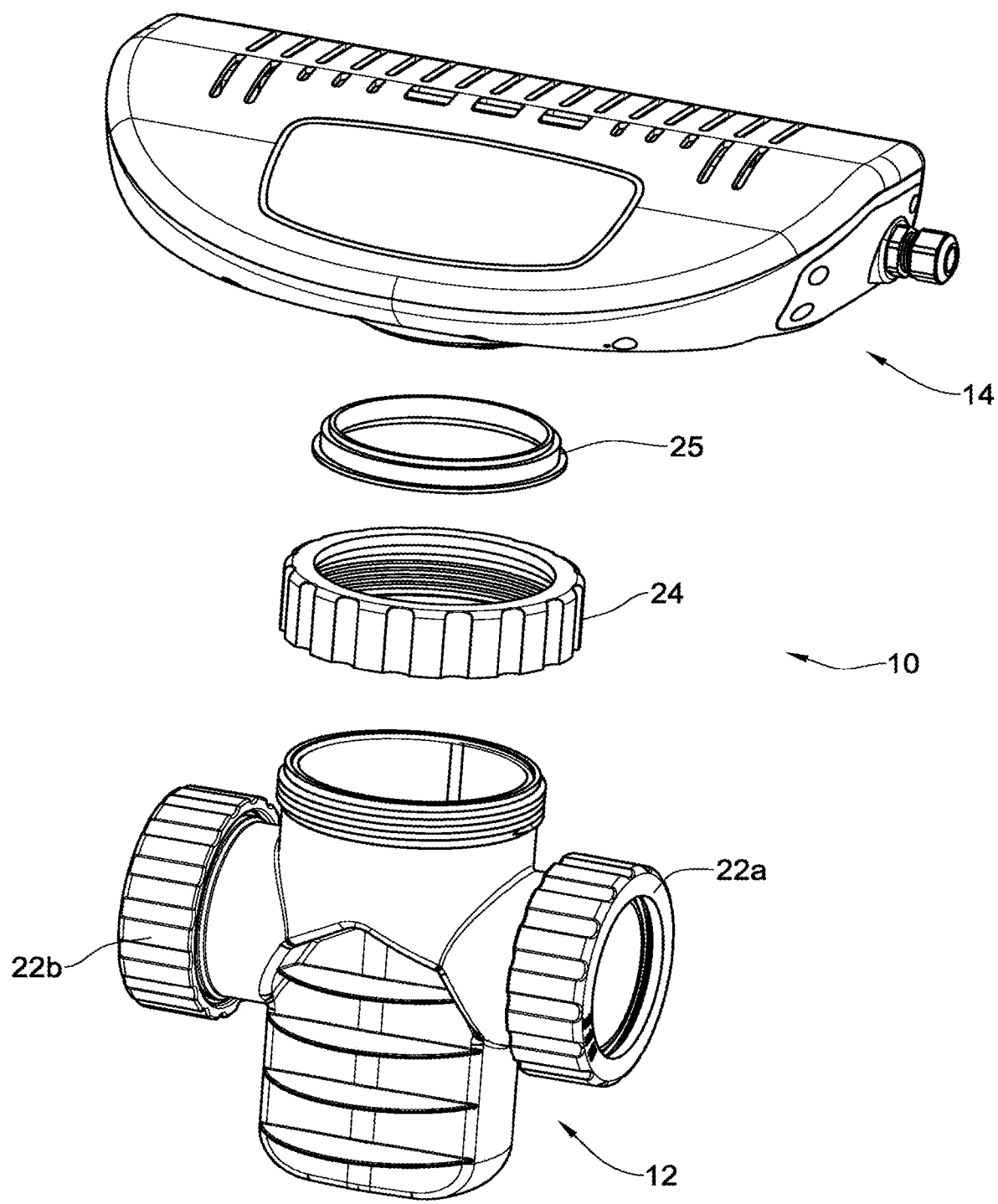
FIG. 1C is another exploded view of the chlorinator illustrated in FIG. 1A, with an electrolysis cassette thereof not shown.

In addition, as seen in FIG. 1C, the chlorinator 10 may further comprise an assembly ring 25, configured to facilitate the main fastening ring 24 to mount the operational and control units 12, 14 to one another. Accordingly, it comprises an upwardly-projecting attachment ridge 27 and a mounting rim 29 projecting outwardly therefrom.

Figure 1D:
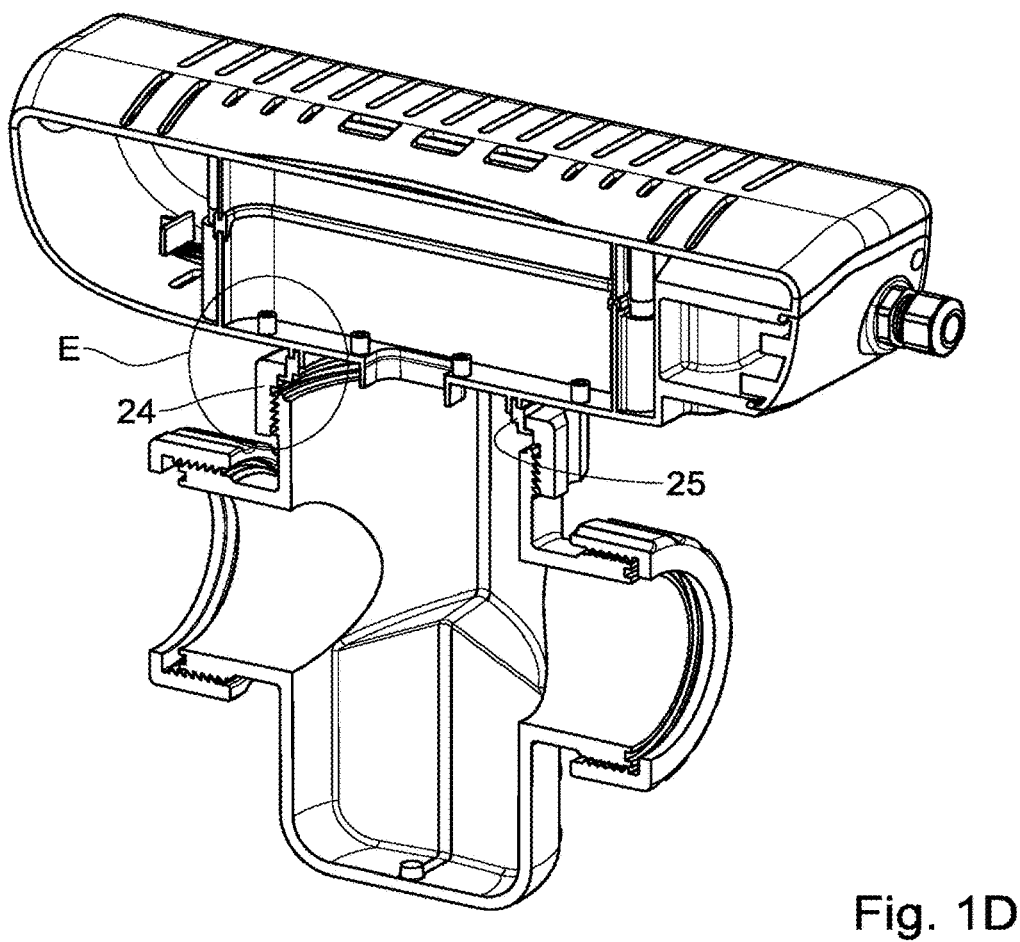
FIG. 1D is a cross-sectional view taken along line I-I in FIG. 1A, with some internal elements thereof not illustrated.
Figure 1E:
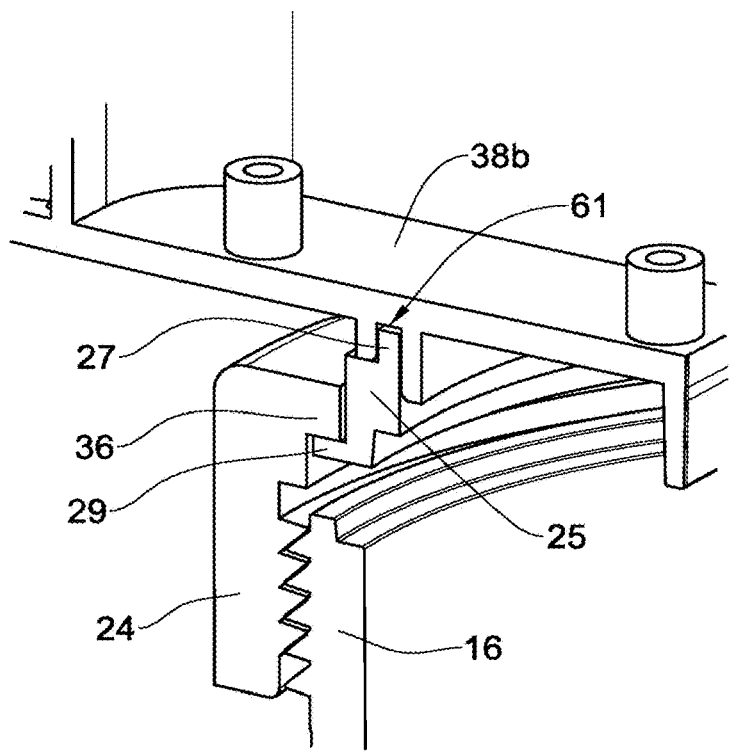
FIG. 1E is a close-up view of the area indicated at "E" in FIG. 1D.

The attachment ridge 27 is configured for being received within a corresponding circular groove 61 formed on the underside of the control unit 14 (best seen and indicated in FIG. 3), for example snuggly, or secured therein for example with an adhesive or by another suitable bonding method. As best seen in FIGS. 1D and 1E, the mounting rim 29 has a larger diameter than the opening defined by the lip 36 of the main fastening rim 24 (it will be appreciated that some elements, such as suitable sealing means and the electrolysis cassette 46 are not illustrated in FIGS. 1D and 1E, but are accommodated in spaces formed between the operational unit 12, control unit 14, main fastening ring 24, and assembly ring 25, as necessary).

The main fastening ring 24 may thus be mounted to the bottom of the control unit 14 by engagement of its (upwardly-disposed) lip 26 on the mounting rim 29 of the assembly ring 25, and concurrently mounted to the operational unit 12 via the threading provided on its (downwardly-disposed) inner surface 28. Accordingly, the main fastening ring 24 may serve to facilitate assembly of the operational unit 12, control unit 14, electrolysis cassette 46 (for example below the lip 36 and mounting rim 29), and optionally other components to provide a compact chlorinator 10.

It will be appreciated that terms such as upward, downward, etc., and related forms refer to the orientation of the chlorinator 10 and elements thereof as illustrated in the accompanying drawings, and are not to be interpreted as limiting the presently disclosed subject matter to a particular orientation, except if indicated or implied, and/or regarding relative disposition of elements.

Figure 3:
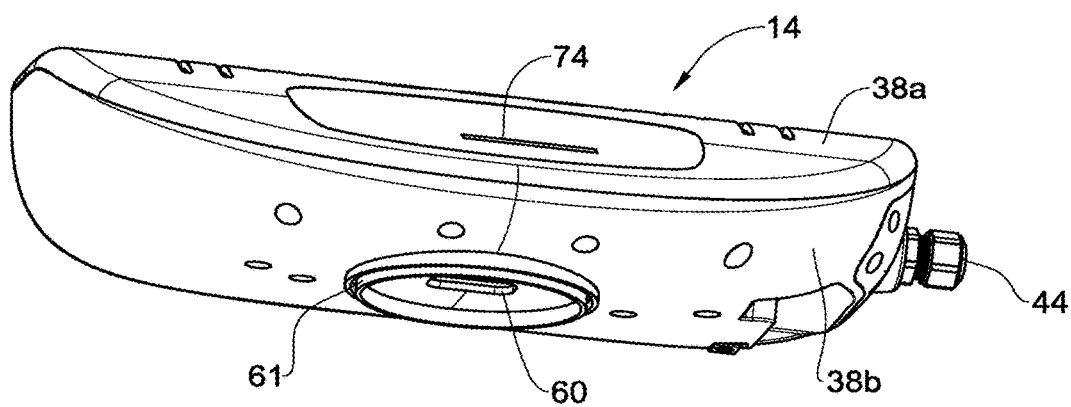
FIG. 3 is a bottom perspective view of a control unit of the chlorinator illustrated in FIG. 1A.
Figure 4:
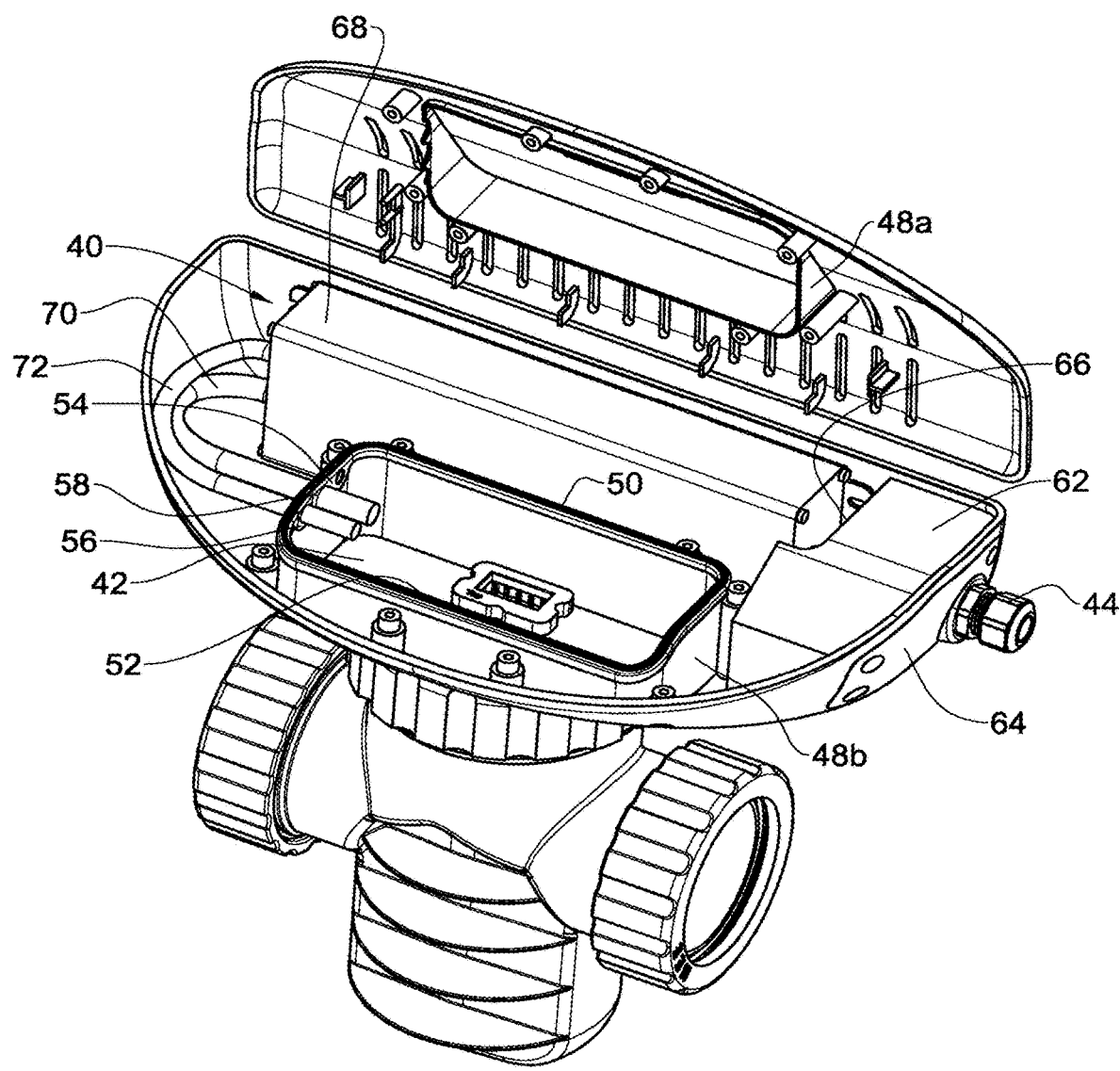
FIG. 4 is a top perspective view of the chlorinator illustrated in FIG. 1A, with an upper housing of the control unit thereof pivoted open.

The control unit 14 comprises elements for controlling and powering the electrolysis cassette 46. As illustrated in FIGS. 3 and 4, it comprises upper and lower housing sections 38a, 38b (herein the present disclosure, the term "housing" will be used to refer to the housing sections collectively), enclosing therewithin a power unit 40, and a controller 42. It further comprises an electrical inlet 44 configured to facilitate connecting the power unit 40 to an external source of power, and a user interface (not illustrated).

The housing 38 is configured to fluidly isolate the controller 42 therewithin. It may further be configured to isolate other elements. This facilitates protection of some of the elements within the housing 38, e.g., in the event of accidental ingress of water therewithin.

Accordingly, as best seen in FIG. 4, the housing 38 comprises upper and lower chamber portions 48a, 48b defining, when the housing sections 38a, 38b are closed, an enclosure for receipt of the controller 42 therewithin. A sealing member such as a gasket 50 is provided to seal between contacting edges of the chamber portions 48a, 48b. The gasket 50 may comprise a cord 52 which is formed so as to conform to the shape of most of the edge of the lower chamber portion 48b, and a projection 54 formed so as to conform to the shape of a cutout 56 formed in the lower chamber portion. The projection 54 comprises one or more apertures 58, allowing for passage therethrough and sealing of one or more cables (the cables illustrated in FIG. 4 are components of the power unit 40, as will be described below). As seen in FIG. 3, a bottom wall of the lower housing section 38b is provided with an aperture 60 for passage therethrough of a portion of the electrolysis cassette 46, in which a grommet (not illustrated) or other sealing element is provided to prevent ingress of water thereto.

The housing 38 may further be formed with a power-connection chamber 62, defining therewithin an enclosure within which an electrical connection may be made, in any suitable way, between the power unit 40 and an external source of power. As the connection may comprise an area in which electrical insulation is compromised, it may be desirable to dispose the point(s) of connection within a waterproof area. The enclosure may be further defined by a removable cover 64, which is sealing attached to the housing 38, providing access to the enclosure, e.g., to facilitate making and/or providing maintenance to the electrical connection. The electrical inlet 44 may be provided on the cover 64, and it may similarly be provided with an internal seal, so that when an electrical cable having a suitable diameter is inserted therethrough, it provides fluid isolation. A rear side 66 of the power-connection chamber 62 may comprise an aperture (not seen) with a suitable seal, such as a grommet, thereby facilitating introduction into the enclosure of an input cable of the power unit 40 (described below) without compromising the waterproofing provided.

The power unit 40 comprises a power supply 68, an input cable (not illustrated; obstructed in FIG. 4 by the power-connection chamber 62), an output cable 70, and a control cable 72 (the output and control cables are illustrated truncated; it will be appreciated that they are each provided to be of a suitable length).

The power supply 68 may be any suitable device configured to convert a predefined input power (e.g., main electricity, alternating current) into an output power which the electrolysis cassette 46 is designed to use (e.g., lower voltage, direct current). The input power is provided by the input cable, which is connected between an external power source (as described above) and the power supply 68.

According to some examples, the power supply 68 is configured to selectively vary its outputs, e.g., it may change the current level of its output to at least one intermediate output level other than full power. The intermediate output levels may comprise a plurality of discrete outputs, or a continuous range of outputs. Accordingly, the controller 42 may be configured to operate the power supply to vary its output, e.g., to control the rate of electrolysis, during operation of the chlorinator 10.

According to some modifications, the power supply 68 may be a power supply/driver designed for use with an LED. According to other modifications (not illustrated), the power supply 68 may comprise an array of low-power power supply modules, each of which may be selectively activated (i.e., turned on and off) independently of the others; accordingly, the output of the power supply 68 is varied by selectively turning each of the power supply modules on or off.

The controller 42 may be configured to receive input regarding the level and/or the change in parameters of the water, from elements of the chlorinator 10 and/or from sensors external thereto, and to vary the rate of electrolysis (i.e., by directing the power supply 68 to vary its output) in response thereto. These parameters may include, but are not limited to, one or more of pH level, salinity, chlorine level, oxidation/reduction (ORP) potential, level of contaminants in the water, or temperature. For example, the controller 42 may be configured to decrease the current output by the power supply 68, and thereby lower the rate of electrolysis, in response to a detected drop in the salinity of the water.

The controller 42 may be further configured to receive an input from a user, for example via the user interface, or parallely-operating system (e.g., a system configured to pump water through the chlorinator 10, a system configured to supply salt to the water, etc.) to increase and/or decrease the rate of electrolysis, and to direct operation of the power supply 68 accordingly. These inputs may include, but are not limited to, one or more of a desired level of chlorination, a flow rate of water being pumped to the chlorinator 10, or an unexpected need for an increased level of sanitizing agent in the water.

The power supply 68 may provide information regarding its internal temperature to the controller 42, wherein the controller may lower the power output of the power supply in order to prevent damage thereto, without ceasing the electrolytic production of sanitizing agents (it will be appreciated that the power supply may be configured to perform this function without direction from the controller, for example being provided with a suitable dedicated controller configured therefor).

The output cable 70 is configured to carry the output power from the power supply 68 to the controller 42. The control cable 72 is configured to facilitate communication between the controller 42 and the power supply 68, e.g., to change the output power level, polarity, begin/end supply of output power, etc. Each of the output and control cables 70, 72 may be designed in a manner suitable (e.g., with respect to number and gauge of wires, shielding, etc.) to its function.

The user interface may comprise a data presentation interface, which may include, but is not limited to, LED's, LCD's, a screen, etc., and one or more input devices, which may include, but are not limited to, button, dials, a touch-screen, etc. an aperture 74 may be provided in the housing 38 to allow connection of the user interface to the controller 42. Accordingly, a suitable seal, such as a grommet (not illustrated) may be provided.

According to some examples, the user interface may be configured to communicate with an external device, such as a network, computer, smartphone, etc. For example, it may comprise a transmitter/receiver for communicating using wired or wireless technology, such as one or more of Bluetooth, Ethernet, Wi-Fi, Zigbee, Near Field Communication, or any other suitable proprietary or open technology.

The controller 42 is configured to direct operation of components of the chlorinator 10. For example, it may collect information from the electrolysis cassette 46, regulate power supply thereto (which may include, but is not limited to, one or more of determining the amount and/or polarity of electricity for supplying to the electrolysis cassette, requesting suitable power from the power unit 40, verifying power received, etc.), receive user commands from the user interface, and provide information for display thereby.

Accordingly, the controller 42 may comprise a printed circuit board (as illustrated), comprising one or more microcontrollers configured to facilitate the directing, as well as any suitable memory modules, sensors, output connectors, power connectors, etc., which may be necessary. In addition, it may comprise a socket, for example comprising one or more apertures, for receiving therein a corresponding plug, for example comprising one or more pins, of the electrolysis cassette, as will be described below, thereby facilitating quickly removing the electrolysis cassette 46 therefrom, and connecting a new one thereto.

It will be appreciated that while herein the specification and claims, the controller 42 is illustrated and described as a single element, it may comprise a combination of elements, which may or may not be in physical proximity to one another, without departing from the scope of the presently disclosed subject matter, mutatis mutandis. In addition, disclosure herein (including recitation in the appended claims) of a controller carrying out, being configured to carry out, or other similar language, implicitly includes other elements of the system 10 carrying out, being configured to carry out, etc., those functions, without departing from the scope of the presently disclosed subject matter, mutatis mutandis.

Figure 5A:
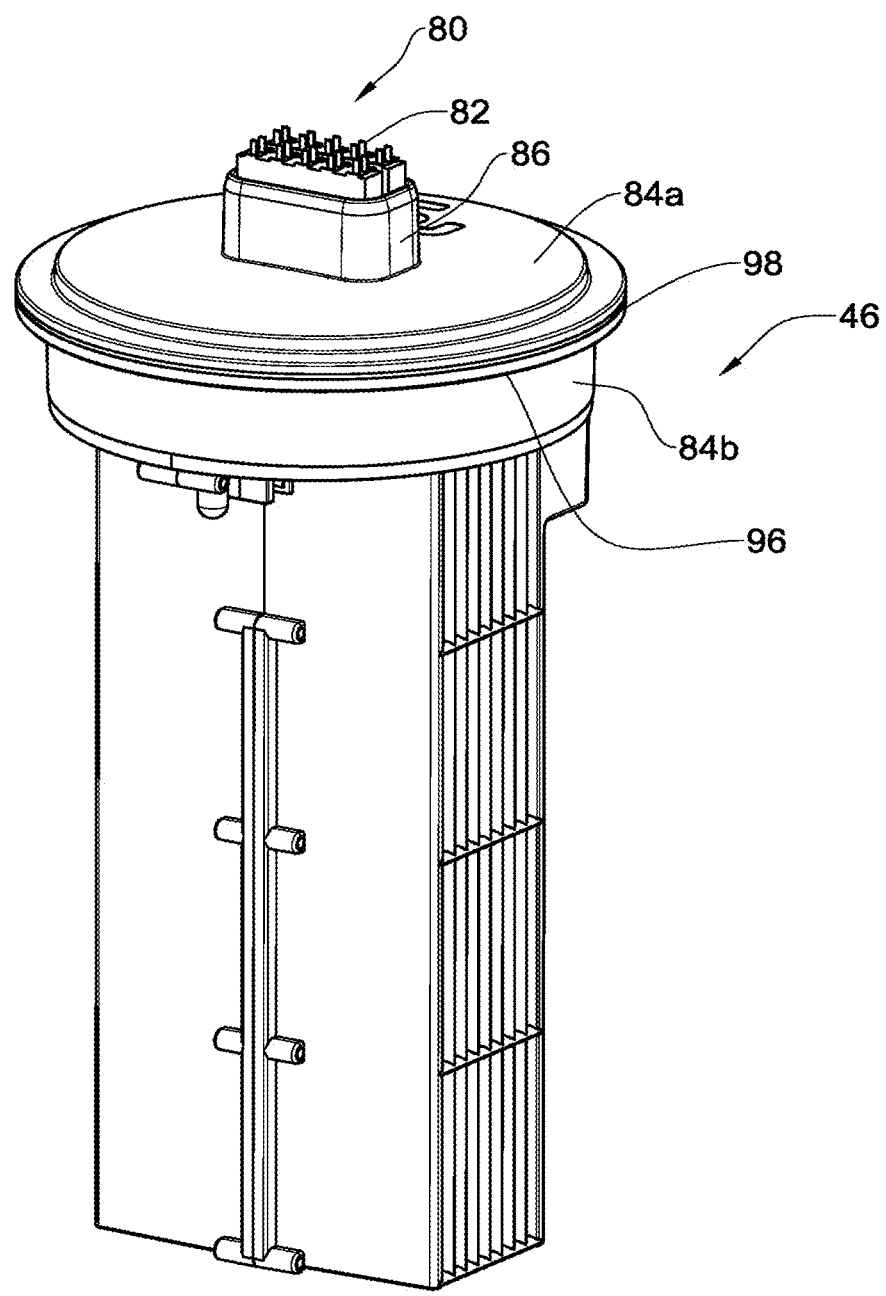
FIG. 5A is a front perspective view of an electrolysis cassette of the chlorinator illustrated in FIG. 1A.
Figure 5B:
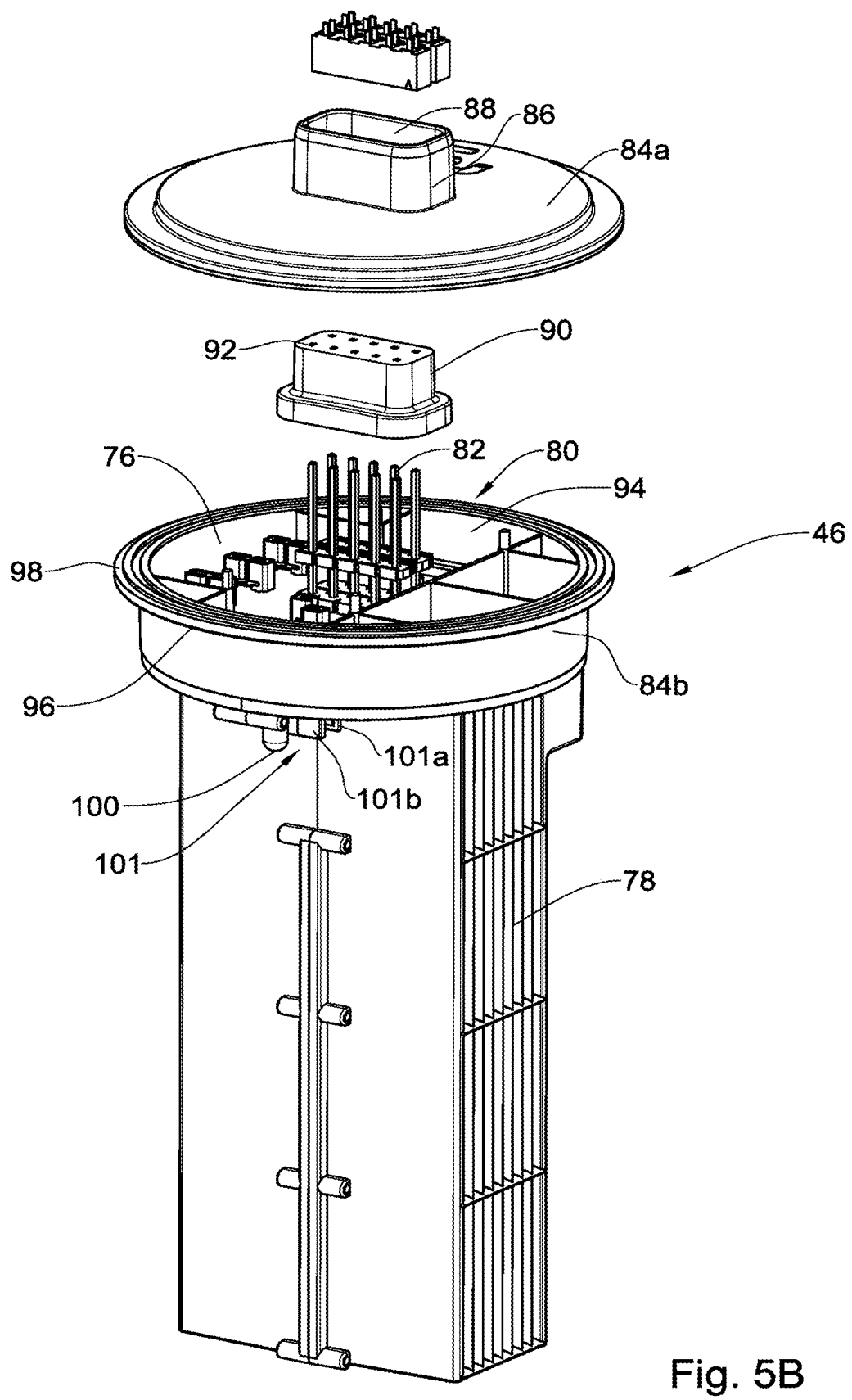
FIG. 5B is an exploded view of the electrolysis cassette illustrated in FIG. 5A.
Figure 5C:
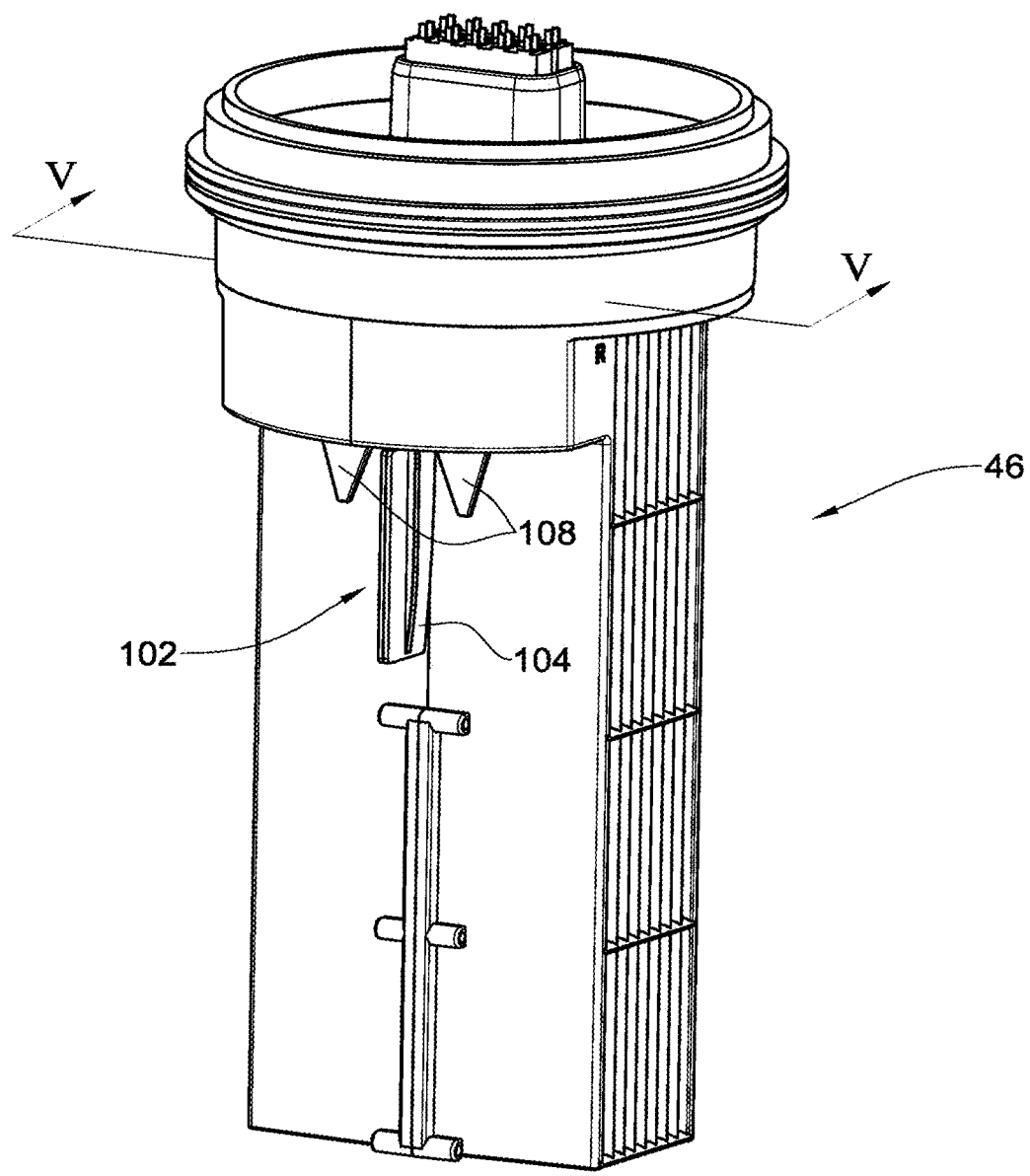
FIG. 5C is a rear perspective view of the electrolysis cassette illustrated in FIG. 5A.

As illustrated in FIGS. 5A through 5C, the electrolysis cassette 46 comprises a cassette controller 76, with a plurality of electrodes, for example in the form of electrolysis plates 78, connected thereto and projecting downwardly therefrom. The electrolysis plates 78 are configured for providing electricity to the water within the electrolysis chamber 16 for electrolysis thereof, for example as described above. A plug 80, comprising a plurality of pins 82, is connected thereto and projects upwardly therefrom. The plug 80 is designed so as to be received by the socket formed correspondingly in the controller 42, as described above, for connection thereto.

Upper and lower cassette housings 84a, 84b are provided, sealingly containing the cassette controller 76 therewithin, and facilitating attachment thereof to the control unit 14.

Accordingly, the upper cassette housing 84a comprises a projection 86, configured to be received within aperture 60 formed in the lower housing section 38b of the control unit 14, and comprising a through-going aperture 88. A grommet 90, or other suitable seating element, it provided, to prevent passage of water from the electrolysis cassette 46 to the controller 42. The grommet 90 is formed so as snuggly fit within the through-going aperture 88 of the projection 86, and comprises a plurality of bores 92 for passage therethrough of the pins 82 of the plug 80.

The lower cassette housing 84b comprises a compartment 94 for receipt therein of the cassette controller 76. It is further provided with an O-ring 96 below an outwardly-projecting rim 98 thereof, for bearing against an upper surface of the electrolysis chamber 16, for sealing it against ingress of water from the electrolysis chamber to the control unit 14 therethrough.

The electrolysis cassette 46 may further comprise one or more of a temperature sensor 100, projecting downwardly into the electrolysis chamber 16, and a salinity sensor (not seen), configured for determining, respectively, the temperature and salinity of the water as if flows through the electrolysis chamber past the electrolysis plates 78. It may further comprise any other suitable sensor for determining different properties of the water in the electrolysis chamber 16. The temperature sensor 100 may be housed within a thermally conductive plastic material. Such a material may have a thermal conductivity which is greater than (for example by a factor of between 5 and 100 times) conventional plastics.

The electrolysis cassette 46 may further comprise an electronic flow sensor, which is generally indicated at 101. The electronic flow sensor 101 comprises a pair of spaced electrodes 101a, 101b, for example formed as parallely arranged plates. The space between the electrodes 101a, 101b constitutes an opening in an otherwise complete circuit. During use, a small current is applied to one of the electrodes. When the electrolysis chamber 16 is full of water, the electronic flow sensor 101 is immersed within water, which completes the circuit; when there are gases within the electrolysis chamber 16, the electronic flow sensor 101 is not immersed in water, leaving the circuit open. When water is flowing through the electrolysis chamber 16, gases which are produced by the electrolysis typically flow out of the chlorinator, resulting in the electrolysis chamber remaining full of water and closing the circuit of the electronic flow sensor 101 as described above. When the flow of water stops, the gases produced by the electrolysis remain in the electrolysis chamber 16 and rise to the top thereof, thereby opening the circuit of the electronic flow sensor 101 as described above. Accordingly, the electronic flow sensor 101 may be used to detect the presence of a flow of water through the electrolysis chamber 16.

Figure 5D:
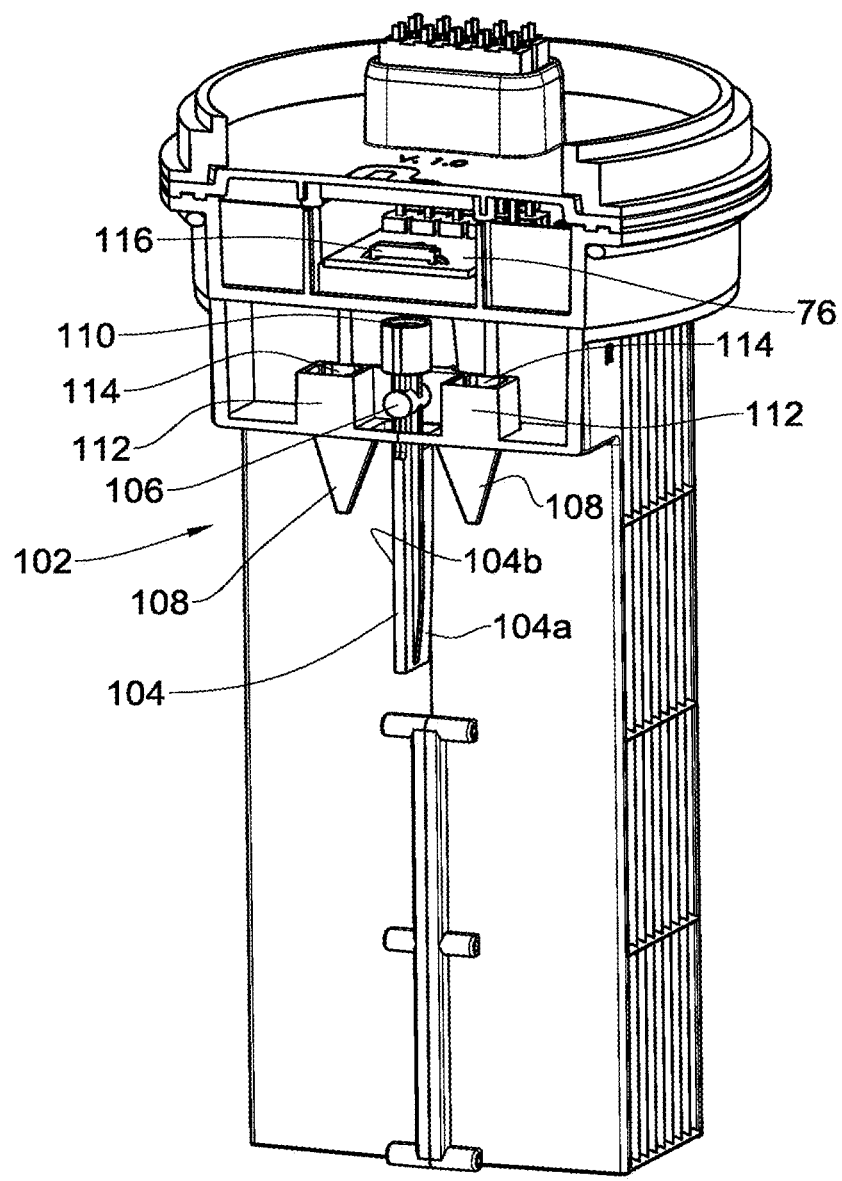
FIG. 5D is a cross-sectional view of the electrolysis cassette, taken along line V-V in FIG. 5C.

As best seen in FIG. 5C, the electrolysis cassette 46 may further comprise a bidirectional mechanical flow sensor 102. The mechanical flow sensor 102 is configured to detect flow of water in the electrolysis chamber 16 across the electrolysis plates 78, while being insensitive to the direction of flow. Accordingly, the chlorinator 10 may be installed without regard to flow direction therethrough. As seen in FIG. 5D, the mechanical flow sensor 102 comprises a paddle 104 pivotally mounted on a shaft 106 so as to pivot freely thereabout. The paddle 104 is disposed such that surfaces 104a, 104b thereof are substantially perpendicular to the direction of flow of water, e.g., perpendicular to the electrolysis plates 78. Stoppers 108 are provided adjacent the paddle 104 to limit its movement. A top end of the paddle 104 comprises a sensing magnet 110 therein. A magnet sensor configured to detect the presence or absence of the sensing magnet 110 therebelow, such as a reed switch 116, is provided above the paddle, e.g., in the cassette controller 76.

The mechanical flow sensor 102 may further comprise a centering arrangement configured to ensure that, in the absence of any external force on the paddle 104, such as from a flow of water thereacross, the paddle remains in a vertical, non-tilted, position. According to some examples, two sockets 112, each having a positioning magnet 114 therein, are provided adjacent the top of the paddle 104. Equal forces exerted by each of the positioning magnets 114 on the sensing magnet 110 maintain the paddle 104, in the absence of a flow of water past it, in a neutral position which is substantially perpendicular to the path via which water flows, such as defined by an axis connection the flow openings 18. The positioning magnets 114 may be arranged such that the dominant magnetic force exerted on the sensing magnet 110 is a repelling magnetic force, i.e., they are each aligned such that the pole thereof (north or south) which faces the sensing magnet 110 is the same as the pole of the sensing magnet closer thereto, i.e., the positioning magnet closer to the north pole of the sensing magnet is aligned with its north pole facing the sensing magnet, and the magnet closer to the south pole of the sensing magnet is aligned with its south pole facing the sensing magnet.

According to other examples (not illustrated), biasing elements, such as springs, are provided to impart equal, but oppositely directed, forces on the paddle 104 when in its rest position, for example above the shaft 106.

It will be appreciated that the centering arrangement as described above is completely external to the paddle 104, i.e., it does not require the addition of any elements to the paddle itself which it does not already comprise for the its use to sense flow of water (e.g., in the example given above relating to the positioning magnets 114, the sensing magnet 110, which the paddle requires for flow sensing, is utilized as well for centering thereof in the absence of flow).

In operation, the centering arrangement maintains the paddle 104 is a vertical rest position, such that the sensing magnet 110 is directly below the reed switch 116. When a flow of water develops, thereby pivoting the paddle 104, the sensing magnet 110 moves away from the reed switch 116, which detects the change, thereby determining the presence of a flow of water through the electrolysis chamber 16. When the flow ceases, the paddle returns to its neutral position, with the sensing magnet 110 below the reed switch, which senses it, determining that there is no flow of water through the electrolysis chamber 16.

It will be appreciated that while the bidirectional mechanical flow sensor 102 described above with reference to FIG. 5D comprises two positioning magnets to maintain the paddle 104 in its neutral position, it may be provided comprising any suitable number of magnets without departing from the scope of the presently disclosed subject matter, mutatis mutandis.

It will be further appreciated that the chlorinator 10 may be configured to use the outputs from one or both of the electronic and mechanical flow sensors 101, 102 to determine the state of flow through the electrolysis chamber 106, to detect an error condition (for example if the electronic and mechanical flow sensors detect different flow conditions from one another), etc.

In addition to the salinity sensor provided, the controller 42 may be configured to determine the salinity of the water by the operational parameters of the electrolysis plates 78, as is well known in the art. It may be further configured to compare the salinity thus determined with that determined by the dedicated salinity sensor. As calcium and/or other mineral deposits build up on the electrolysis plates 78, the determined and measured levels of salinity will deviate. When the deviation has reached a predetermined level, the controller 42 may be configured to reverse the polarity of the electrolysis cassette 46, thereby facilitating breaking up of the deposits and cleaning of the electrolysis plates. In this way, the controller 42 may be configured to clean the electrolysis plates 78 during use, without unnecessarily reversing the polarity of the electrical power, which may, if done too often, result in damage to and/or degrade the performance of the electrolysis plates 78.

In addition, the chlorinator may be configured to connect to external devices. Accordingly, it may comprise one or more of an input/output connector (e.g., for connecting a pH or other similar sensor), a wireless transmitter/receiver (e.g., such as wifi), and/or any other suitable feature.

Figure 6:
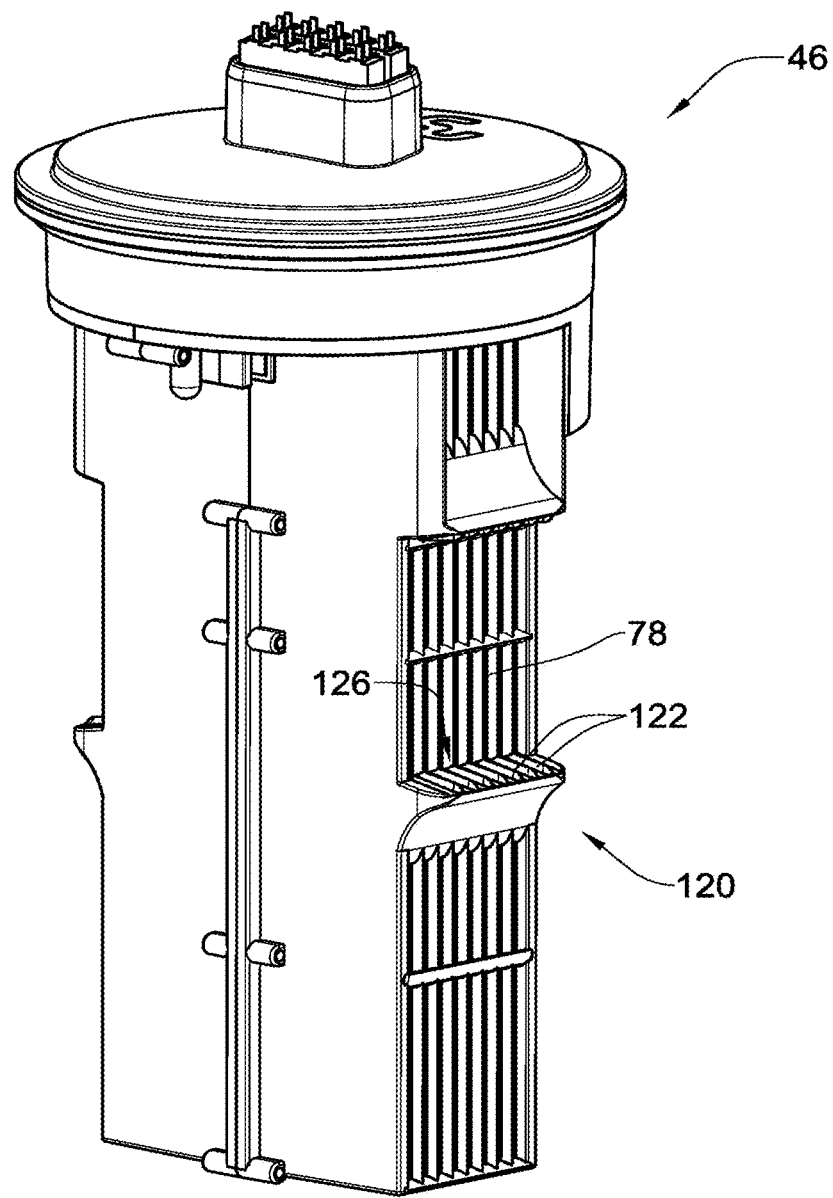
FIG. 6 is a front perspective view of a modification of the electrolysis cassette illustrated in FIG. 5A.

According to a modification, for example as illustrated in FIG. 6, the electrolysis cassette 46 may comprise elements to facilitate directing flow of water therethrough. For example, a flow director 120 may be provided on one or both side of the electrolysis plates 78. Each of the flow directors 120 may comprise a plurality of fins 122 substantially parallel to the electrolysis plates 78, for example co-planar with some or all of the electrolysis plates 78 and a flow guide 124 substantially transverse to the fins and angled with respect to the expected flow of water (e.g., which may be parallel to the short dimension of the electrolysis plates, such as defined by an axis connection the flow openings 18), thereby defining an opening 126 to the flow director. The electrolysis cassette 46 may be provided with two flow directors 120 on one or both sides of the electrolysis plates 78 arranged such that the openings 126 thereof face one another.

Some or all of the fins 122 and/or flow guides 124 may be configured for providing electricity to water passing through the flow directors 120 for electrolysis thereof, for example being formed integrally with some or all of the electrolysis plates 78. In addition, flow directors may be provided separate from the electrolysis plates 78 and/or the electrolysis cassette.

It will be appreciated that while FIG. 6 illustrated an example in which one flow director 120 is provided on each side of the electrolysis cassette 46, any suitable number may be provided, for example arranged vertically along the height of the electrolysis plates 78. The two sides of the cassette 46 may each comprise the same number of flow directors 120 each arranged opposite a corresponding flow director on the other side, the same number arranged differently, different numbers of flow directors, etc., as appropriate.

Figure 7:
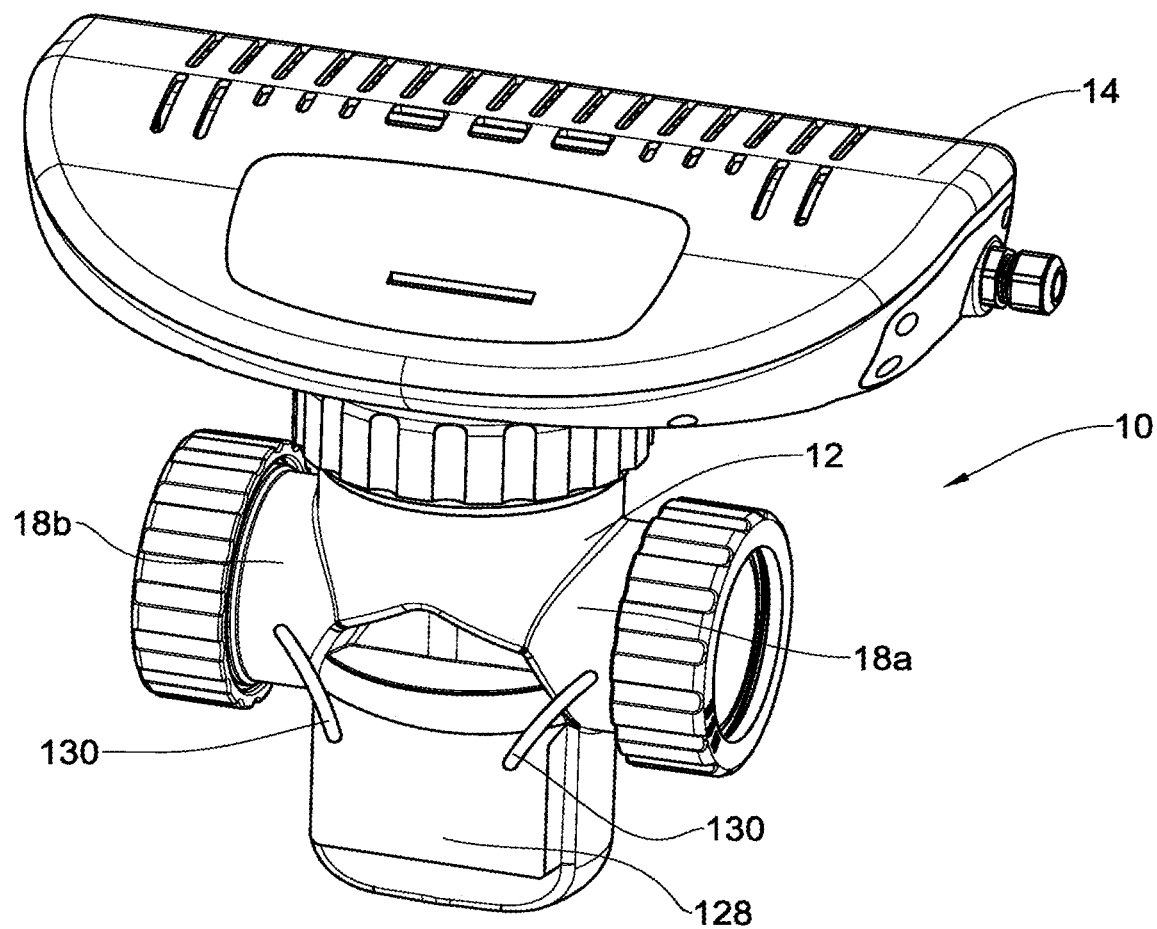
FIG. 7 is a perspective view of a modification of the chlorinator illustrated in FIG. 1A.

According to a modification, for example as illustrated in FIG. 7, the chlorinator 10 may be configured to check the pH level of the water entering the electrolysis chamber 16. As the accuracy of pH measurements may be affected when in close proximity to the electrodes, a dedicated measurement chamber 128, external to the electrolysis chamber 16, may be provided. Supply lines 130, each spanning between one of the flow openings 18 and the measurement chamber 128, are provided to divert some of the water thereto.

Disposed within the measurement chamber 128 are a pH sensor configured to measure the pH level of the water, and/or an ORP sensor configured to measure the oxidation/reduction potential of the water. These sensors may be configured to communicate with the controller 42, for example wirelessly, or using a wire connection. According to one example, the cassette 46 is designed to connect to the sensors within the measurement chamber 128, and to communicate information received therefrom to the controller 42 and/or supply power from the control unit 14 thereto, for example via its plug 80. The operational unit 12 may be designed to facilitate this connection, for example automatically upon insertion of the electrolysis cassette.

The chlorinator 10 may further comprise an acid pump (not illustrated), configured to selectively introduce a predetermined amount of substance to lower the acidity of the water, e.g., in response to measurements taken by the pH and/or ORP sensors. The substance may be hydrochloric acid, $CO_2$, or any other suitable substance. The acid pump may be located on the operation unit 12, inside the control unit 14, or at any other suitable location. It may be connected to an outlet line, a distal end thereof being disposed so as to deliver the substance directly into the electrolysis chamber 16.

Those skilled in the art to which this invention pertains will readily appreciate that numerous changes, variations and modifications can be made without departing from the scope of the invention mutatis mutandis.

The invention claimed is:

1. A cassette for a chlorinator, the chlorinator being configured to produce one or more sanitizing agents from a solute dissolved in water and comprising a chlorinator controller and an operational unit defining an electrolysis chamber for flow therethrough of said water, the chlorinator being configured to receive the cassette such that at least portions thereof are disposed within the electrolysis chamber, the cassette comprising:
   electrolyzing electrodes for the electrolysis; and
   a bi-directional mechanical flow sensor configured to detect a flow of water across said electrolyzing electrodes in each one of two opposite directions, the mechanical flow sensor comprising a paddle configured to be pivoted about an axis from a rest position by said flow of water, a sensing magnet configured to move with said paddle and disposed spaced from the axis, a magnet sensor configured to detect movement of the sensing magnet from the rest position of the paddle, and a centering arrangement configured to maintain the paddle in its rest position in the absence of a flow of water therepast;
   wherein said centering arrangement comprises two or more positioning magnets configured to exert equal magnetic forces on said sensing magnet when the paddle is in its rest position.

2. The cassette according to claim 1, further comprising an electronic flow sensor comprising a pair of spaced-apart sensing electrodes, and a circuit closeable by electrically connecting said sensing electrodes, wherein said electronic flow sensor is configured to detect a flow condition when said circuit is closed, and to detect a non-flow condition when said circuit remains open.

3. The cassette according to claim 2, wherein said sensing electrodes comprise a pair of parallely arranged plates.

4. The cassette according to claim 2, wherein said electronic flow sensor further comprises a sensing controller configured to direct operation thereof and to communicate with said chlorinator controller.

5. The cassette according to claim 2, being configured to detect an error condition when said electronic and mechanical flow sensors detect different flow conditions.

6. The cassette according to claim 1, wherein all elements of the centering arrangement not used for flow sensing are external to said paddle.

7. The cassette according to claim 1, wherein said positioning magnets are aligned such that opposite poles thereof face the sensing magnet.

8. The cassette according to claim 1, wherein the dominant magnetic force exerted by each positioning magnet on the sensing magnet is a repelling magnetic force.

9. The cassette according to claim 1, wherein at least two of said positioning magnets are disposed on opposite sides of the paddle.

10. The cassette according to claim 1, further comprising stoppers configured to limit the movement of the paddle in each direction.

11. The cassette according to claim 10, wherein said stoppers project in a direction from said axis in a direction opposite that in which the sensing magnet is disposed.

12. The cassette according to claim 1, wherein said magnet sensor comprises a reed switch.

13. The cassette according to claim 1, wherein said electrolyzing electrodes are formed as flat plates.

14. A cassette for a chlorinator, the chlorinator being configured to produce one or more sanitizing agents from a solute dissolved in water, the chlorinator comprising an operational unit defining an electrolysis chamber for flow therethrough of said water and a chlorinator controller, the chlorinator being configured to receive the cassette such that at least portions thereof are disposed within the electrolysis chamber, the cassette comprising:

electrolyzing electrodes for electrolysis; and a bi-directional mechanical flow sensor configured to detect a flow of water across said electrolyzing electrodes in each one of two opposite directions, the mechanical flow sensor comprising a paddle configured to be pivoted about an axis from a rest position by said flow of water, and a centering arrangement configured to maintain the paddle in its rest position in the absence of a flow of water therepast;

wherein said centering arrangement comprises two or more biasing elements, configured to impart equal, but oppositely directed, forces on the paddle in its rest position.

15. The cassette according to claim 14, further comprising an electronic flow sensor comprising a pair of spaced-apart sensing electrodes, and a circuit closeable by electrically connecting said sensing electrodes, wherein said electronic flow sensor is configured to detect a flow condition when said circuit is closed, and to detect a non-flow condition when said circuit remains open.

16. The cassette according to claim 15, being configured to detect an error condition when said electronic and mechanical flow sensors detect different flow conditions.

* * * * *